United States Patent
Brown et al.

(10) Patent No.: US 7,182,858 B2
(45) Date of Patent: Feb. 27, 2007

(54) MULTIPLE BARRIER FILTER APPARATUS

(75) Inventors: Keith E. Brown, Solon, OH (US); Paul Peterson, Cuyahoga Falls, OH (US); Stuart Park, Burton, OH (US); Ron Kindel, Chardon, OH (US); Eric Sklar, Northville, MI (US); John Miller, Sunnyside, NY (US); Ken Weight, Hampshire (GB)

(73) Assignee: Kinetico Incorporated, Newbury, OH (US)

( * ) Notice: Subject to any disclaimer, the term of this patent is extended or adjusted under 35 U.S.C. 154(b) by 119 days.

(21) Appl. No.: 10/433,495

(22) PCT Filed: Mar. 4, 2003

(86) PCT No.: PCT/US03/06419

§ 371 (c)(1),
(2), (4) Date: May 30, 2003

(87) PCT Pub. No.: WO03/076044

PCT Pub. Date: Sep. 18, 2003

(65) Prior Publication Data

US 2004/0164006 A1    Aug. 26, 2004

(51) Int. Cl.
| | | |
|---|---|---|
| B01D 35/153 | (2006.01) | |
| B01D 35/30 | (2006.01) | |
| B01D 36/02 | (2006.01) | |
| B01D 36/04 | (2006.01) | |
| B01D 35/143 | (2006.01) | |

(52) U.S. Cl. .................. 210/117; 137/597; 137/798; 137/801; 137/802; 210/87; 210/110; 210/136; 210/257.2; 210/321.72; 210/335; 210/443; 210/449; 222/189.06

(58) Field of Classification Search .............. 210/87, 210/109, 110, 117, 136, 257.1, 257.2, 259, 210/314, 316, 323.2, 335, 340, 424, 440, 210/443, 444, 449, 460, 641, 650, 652, 321.72, 210/323.1; 137/445, 801, 343, 597, 798, 137/802; 222/189.06; 285/120.1
See application file for complete search history.

(56) References Cited

U.S. PATENT DOCUMENTS 3,570,675 A    3/1971 Pall (Continued)

FOREIGN PATENT DOCUMENTS

| WO | WO 98/01207 | 1/1998 |
| WO | WO 00/71229 | 11/2000 |
| WO | WO 01/16036 | 3/2001 |

OTHER PUBLICATIONS

Monroe, PGPUBS Document US 2002/0189985, published Dec. 19, 2002.*

*Primary Examiner*—Joseph Drodge
(74) *Attorney, Agent, or Firm*—Tarolli, Sundheim, Covell & Tummino, LLP

(57) ABSTRACT

A filter apparatus is provided which includes a first filter membrane element (40a), and a second bacterial filter membrane element. The first viral filter element (40a) is capable of treating water at a first second flow rate and is adapted to remove contaminants which are larger than a first size, while the second bacterial filter element (40b) is capable of treating water at a second higher flow rate and is adapted to remove contaminants which are larger than a second contaminant size. The first and second filter elements (40a), (40b) may be commonly housed within a sealed housing. An accumulating vessel (60) is placed in fluid communication with an outlet of the first filter element (40a) and an outlet of the second filter element (40b). The filter apparatus includes a duck bill type check valve (75) made of an antimicrobial material intermediate the second filter element (40b) and a dispensing faucet (70).

66 Claims, 10 Drawing Sheets

U.S. PATENT DOCUMENTS

| | | | |
|---|---|---|---|
| 3,975,273 A | 8/1976 | Shaltz et al. | |
| 4,033,881 A | 7/1977 | Pall | |
| 4,154,688 A | 5/1979 | Pall | |
| 4,278,548 A | 7/1981 | Bettinger et al. | |
| 4,317,726 A * | 3/1982 | Shepel | 210/236 |
| 4,322,293 A | 3/1982 | Morgan, Jr. | |
| 4,610,790 A * | 9/1986 | Reti et al. | 210/636 |
| 4,629,568 A | 12/1986 | Ellis, III | |
| 4,650,586 A | 3/1987 | Ellis, III | |
| 4,673,498 A | 6/1987 | Swinney et al. | |
| 4,681,677 A | 7/1987 | Kuh et al. | |
| 4,698,164 A | 10/1987 | Ellis | |
| 4,713,175 A | 12/1987 | Bray | |
| 4,801,375 A | 1/1989 | Padilla | |
| 4,820,460 A | 4/1989 | Repetti et al. | |
| 4,888,115 A | 12/1989 | Marinaccio et al. | |
| 4,906,373 A | 3/1990 | Drori | |
| 4,921,654 A | 5/1990 | Hou et al. | |
| 4,980,056 A | 12/1990 | Norton | |
| 5,006,234 A | 4/1991 | Menon et al. | |
| 5,030,347 A | 7/1991 | Drori | |
| 5,064,531 A | 11/1991 | Wang et al. | |
| 5,078,876 A | 1/1992 | Whittier et al. | |
| 5,126,043 A | 6/1992 | Giordano et al. | |
| 5,205,930 A | 4/1993 | Obrestad | |
| 5,207,916 A | 5/1993 | Goheen et al. | |
| 5,227,053 A | 7/1993 | Brym | |
| 5,282,967 A * | 2/1994 | Tatsuno et al. | 210/638 |
| 5,389,254 A | 2/1995 | Sherman | |
| 5,569,380 A | 10/1996 | Sullivan | |
| 5,702,592 A | 12/1997 | Suri et al. | |
| 5,705,067 A | 1/1998 | Sumi et al. | |
| 5,728,298 A | 3/1998 | Hamlin | |
| 5,766,468 A | 6/1998 | Brown et al. | |
| 5,817,231 A * | 10/1998 | Souza | 210/96.2 |
| 5,868,933 A | 2/1999 | Patrick et al. | |
| 5,876,601 A | 3/1999 | Geibel et al. | |
| 5,882,517 A | 3/1999 | Chen et al. | |
| 5,928,588 A | 7/1999 | Chen et al. | |
| 5,951,863 A | 9/1999 | Kruger et al. | |
| 5,976,363 A * | 11/1999 | Monroe et al. | 210/90 |
| 5,993,648 A * | 11/1999 | Hunter et al. | 210/94 |
| 6,001,249 A | 12/1999 | Bailey et al. | |
| 6,027,647 A | 2/2000 | Northcut et al. | |
| 6,080,313 A | 6/2000 | Kelada | |
| 6,099,612 A | 8/2000 | Bartos | |
| 6,120,689 A * | 9/2000 | Tonelli et al. | 210/652 |
| 6,139,739 A | 10/2000 | Hamlin et al. | |
| 6,139,741 A | 10/2000 | McGibbon | |
| 6,217,751 B1 | 4/2001 | Peeters | |
| 6,231,770 B1 | 5/2001 | Bormann et al. | |
| 6,248,236 B1 | 6/2001 | Hodgkins | |
| 6,258,265 B1 | 7/2001 | Jones | |
| 6,290,856 B1 | 9/2001 | Beall | |
| 6,334,959 B1 | 1/2002 | Sutton et al. | |
| 6,337,018 B1 | 1/2002 | Mickols | |
| 6,338,798 B2 | 1/2002 | Hopkins et al. | |
| 6,416,668 B1 * | 7/2002 | Al-Samadi | 210/636 |
| 6,428,708 B1 | 8/2002 | Halemba et al. | |
| 6,436,282 B1 * | 8/2002 | Gundrum et al. | 210/117 |
| 6,524,472 B2 * | 2/2003 | Monroe | 210/321.6 |
| 6,607,668 B2 * | 8/2003 | Rela | 210/321.6 |
| 2002/0189985 A1 * | 12/2002 | Monroe | 210/90 |
| 2005/0029192 A1 * | 2/2005 | Arnold et al. | 210/321.6 |

* cited by examiner

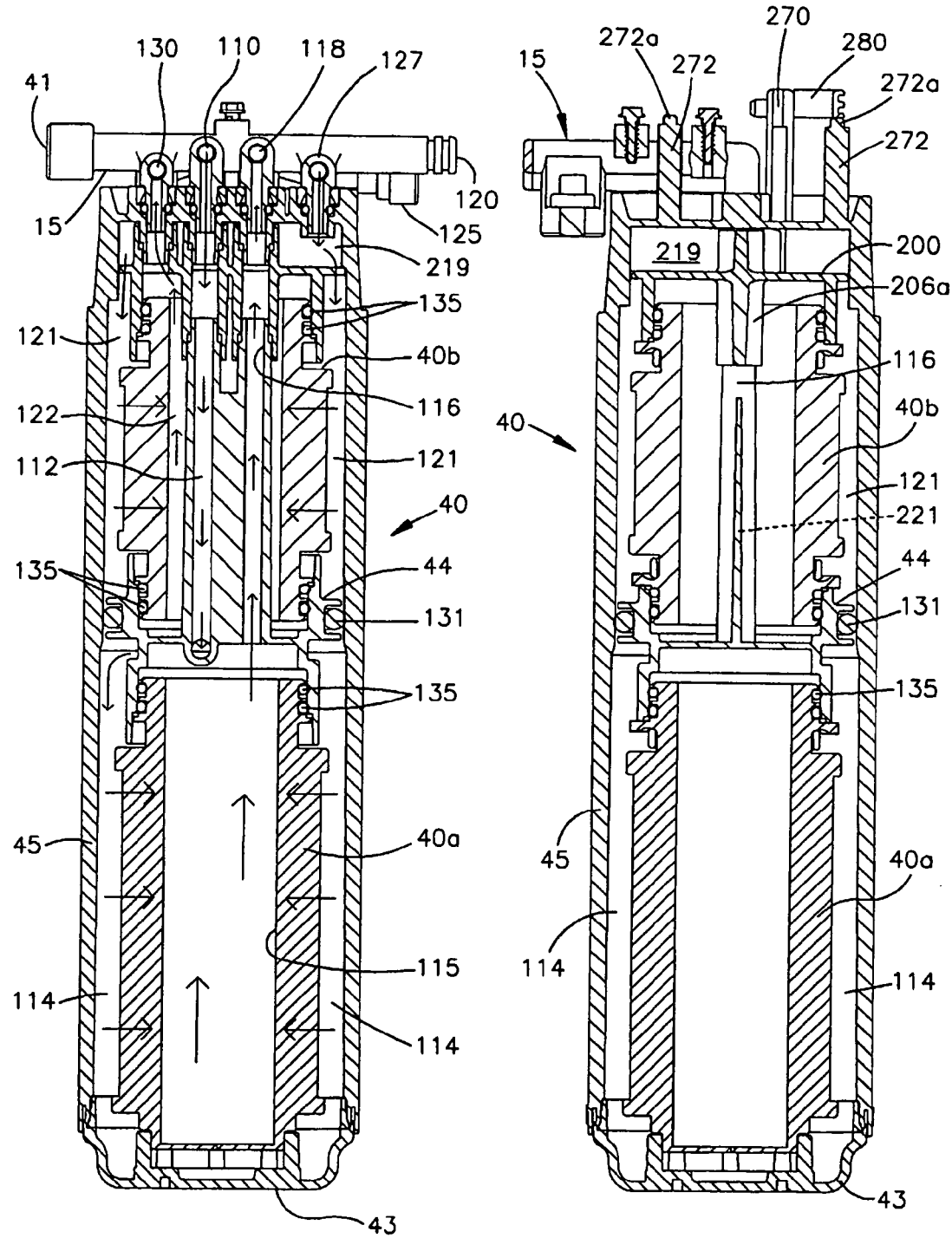

MULTIPLE BARRIER FILTER APPARATUS

TECHNICAL FIELD

The present invention relates generally to filtering systems and in particular to a filtering apparatus that includes multiple filtering elements.

BACKGROUND OF THE INVENTION

For at least the last 15 years, there have been several configurations of "under-sink" reverse osmosis (RO) systems designed to improve the quality of a relatively small amount of water to be used for drinking and cooking by a homeowner. A few examples of such systems are described in U.S. Pat. Nos. 4,650,586 and 4,629,568 both of which are owned by the assignee of the present invention and incorporated herein by reference.

An objective of typical under sink reverse osmosis systems is to decrease the total dissolved solids (TDS) of the supplied city or well water and thereby improve the taste, odor or chemical makeup of the water. These under the sink reverse osmosis systems can be upgraded to include additional unit processes to pre-treat the incoming water for chlorine or sediment removal prior to the RO unit. This pre-treatment improves the operation and prolongs the life of the RO membrane. In addition pre-treatment further polishes the water produced by the RO membrane to remove both trace organics that might cause taste issues and small molecular weight contaminants that might pass through or be poorly rejected by the RO membrane. Therefore today there are many versions of RO units that effectively remove or reduce specific unwanted ionic contaminants and or organics to improve the quality of the water for the use of the homeowner.

There is increasing concern that some of the water supplies, both from wells, surface waters or even municipalities may, from time to time contain unwanted microbiological contaminants such as pathogens, that may be harmful when ingested by people, especially persons with immune system deficiencies.

While the pore size of the common RO membrane is sufficiently small to prevent the passing of microbiological contaminants, testing over the years has shown that the RO unit alone cannot consistently meet the relatively stringent requirements to be classified a "microbiological purifier" as defined in EPA in the "Guide Standard and Protocol for Testing Microbiological Water Purifiers" (1987 revision). It is believed that the reason for this is the imperfections in the RO membrane itself or in the methods of bonding the membrane together at the ends of the assemblies. While there are several methods available to deal with such concerns, such as boiling the water for several minutes or adding anti-pathogen agents like iodine to the water, most of these are not convenient and/or may make the water less pleasant to drink. Ultraviolet light filters that neutralize contaminants by exposure to certain wavelengths of light are also known in the art. These filters suffer from several practical drawbacks including the fact that they rely on electricity to function and also require relatively complex controls to ensure that water is not overheated due to extended exposure to the light.

SUMMARY OF THE INVENTION

By adding multiple barrier filter capabilities to a traditional under sink RO unit, improved removal of microbiological contaminants, unwanted ionic species, and organics can be achieved.

According to the present invention a filter apparatus for treating water containing particulate or microbial contaminants is provided. The filter apparatus includes a first filter element disposed within a first sealed outer housing and in fluid communication with a first inlet port and a first outlet port. The first filter element is capable of treating water at a first flow rate and is adapted to remove contaminants that are larger than a first contaminant size. A second filter element is disposed downstream of the first filter element in fluid communication with a second inlet port and a second outlet port. The second filter element is capable of treating water at a second flow rate higher than the first flow rate and is adapted to remove contaminants that are larger than a second contaminant size. An accumulating vessel is placed in fluid communication with the first outlet port and the second inlet port for storing water that has been treated by the first filter element prior to treatment by the second filter element.

For a preferred embodiment that is directed to removing microbial contaminants, the first filter element is a virus filter membrane capable of removing contaminants larger than 0.01 micron and the second filter element is a bacteria filter membrane capable of removing contaminants larger than 0.1 micron.

In an exemplary embodiment that facilitates under sink mounting, the second filter element is disposed within the first sealed outer housing. According to a feature, at least one of the first and second filter elements is generally cylindrical in shape and has a central void and the water flowing to and from the other of the first and second filter element flows within the central void. According to another feature, the first inlet port, first outlet port, second inlet port, and second outlet port are disposed on a single surface of the sealed outer housing. According to yet another feature, a flow limiting device is place in fluid communication with the first filter element for controlling the flow of water to the first filter element.

According to an embodiment a pretreatment filter is placed in fluid communication with the first inlet port for removing relatively large contaminants prior to treatment by the first and second filter elements. According to an embodiment, a post filter is placed in fluid communication with the accumulating vessel and adapted to remove contaminants that originate in the accumulating vessel or may have passed through prior filters. In an embodiment, a cross flow membrane filter, such as a reverse osmosis filter, is placed in fluid communication with the first inlet port. In a preferred embodiment, a check valve is placed on a concentrate line of the cross flow membrane filter.

In an exemplary embodiment, a flow monitor is placed in fluid communication with the first outlet port to monitor an amount of water that has been treated by the filter apparatus. According to a feature, the flow monitor is operable to discontinue the flow of water through the filter apparatus when a predetermined amount of water has been treated by the filter apparatus. In one embodiment, the flow monitor is part of the post filter.

In a preferred embodiment, the filter apparatus includes a check valve in fluid communication with the second outlet port and downstream of the second filter element for preventing backflow of contaminated water into the filter apparatus. According to a feature of the invention, the check valve is a duck bill check valve installed in a treated water dispensing faucet in fluid communication with the second outlet port and through which treated water flows out of the filter apparatus. According to another feature the check is made of an antimicrobial material.

Another exemplary embodiment of the inventive filter apparatus is adapted to treating water containing microbial contaminants. A viral membrane filter is disposed within a first sealed outer housing and in fluid communication with a first set of inlet and outlet ports. The viral membrane filter is adapted to remove viral contaminants. A bacterial filter membrane is disposed downstream of the viral membrane and in fluid communication with a second set of inlet and outlet ports, the bacterial filter membrane adapted to remove contaminants.

In an embodiment that facilitates under sink mounting, the bacterial filter element is disposed within the first sealed outer housing. According to a feature, at least one of the viral and bacterial filter membranes is generally cylindrical in shape and has a central void such that water flowing to and from the other of the viral and bacterial filter membrane flows within the central void. According to another feature, the first inlet port, first outlet port, second inlet port, and second outlet port are disposed on a single surface of the sealed outer housing.

According to an embodiment a pre-treatment filter is placed in fluid communication with the first inlet port for removing relatively large contaminants prior to treatment by the first and second filter elements. According to an embodiment, an accumulating vessel is placed in fluid communication with the first outlet port to store water that has been treated by the viral filter membrane prior to being treated by the bacterial filter membrane. According to a feature a post filter is placed in fluid communication with the accumulating vessel and adapted to remove contaminants that originate in the accumulating vessel or pass through prior filters. In an embodiment, a cross flow membrane filter is placed in fluid communication with the first inlet port.

In an exemplary embodiment, a flow monitor is placed in fluid communication with the first outlet port to monitor an amount of water that has been treated by the filter apparatus. According to a feature, the flow monitor is operable to discontinue the flow of water through the filter apparatus when a predetermined amount of water has been treated by the filter apparatus. In one embodiment, the flow monitor is part of the post filter.

In a preferred embodiment, the filter apparatus includes a check valve in fluid communication with the second outlet port and downstream of the second filter element for preventing backflow of contaminated water into the filter apparatus. According to a feature of the invention, the check valve is a duck bill check valve installed in a treated water dispensing faucet in fluid communication with the second outlet port and through which treated water flows out of the filter apparatus. According to another feature the check is made of an antimicrobial material.

According to a preferred embodiment, a filter apparatus for removing contaminants from water containing microbial contaminants includes a cross flow membrane filter for removing a significant amount of relatively large contaminants from the water. A viral membrane filter is disposed within a first sealed outer housing and in fluid communication with cross flow membrane filter that is adapted to remove viral contaminants and a bacterial membrane filter is in fluid communication with the viral membrane filter that is adapted to remove bacterial contaminants. According to a feature of this embodiment, the cross flow membrane filter is a reverse osmosis filter. An additional feature is an accumulating vessel disposed between and in fluid communication with the viral membrane filter and the bacterial membrane filter for storing water that has been treated by the viral membrane. Preferably, the bacterial membrane filter is disposed in the first sealed outer housing and at least one of the viral and bacterial filter membranes is generally cylindrical in shape and has a central void and such that water flowing to and from the other of the viral and bacterial filter membrane flows within the central void.

According to an embodiment of the invention, a treated water dispensing faucet for dispensing water that has been treated to remove contaminants includes a conduit for directing the flow of treated water from a filtration system to a dispensing station. The conduit has a first end connected to the filtration system and a second end that includes an orifice that opens to the dispensing station. A check valve is mounted to the second end for preventing the back flow of contaminants to the filtration system. According to a feature, the check valve is a duck bill check valve that includes antimicrobial material. According to yet another feature, a valve shield member substantially encloses the check valve for preventing contact between foreign objects and the check valve.

According to another feature of the invention, a filter cartridge is disclosed that includes a housing that defines first and second isolated regions within the housing. The first region includes a first filter and a flow path extending from a first inlet to a first outlet. The second region defines a flow path extending between a second inlet port and a second outlet port. The ports are arranged in a substantially linear, side-by-side relationship and are adapted to establish fluid connections between the filter cartridge and a manifold forming part of a water treatment system as the filter cartridge is installed into its operative position. In the preferred embodiment, the first region includes a viral filter and the second region includes a bacterial filter.

Although the construction illustrated in the preferred embodiment includes a viral filter and a bacterial filter located in the same replaceable housing, it should be understood that aspects of this invention can be applied to systems in which separate viral and bacterial filter units are utilized, as opposed to having both filters in one housing.

These and other objects, advantages, and features of the invention will be better understood from the accompanying detailed description of preferred embodiments of the invention when reviewed in conjunction with the accompanying drawings.

BRIEF DESCRIPTION OF THE DRAWINGS

The present invention is illustrated by way of example and not limitation in the figures of the accompanying drawings, in which:

FIG. 4 is a cross section of a multiple barrier microbial filter of the water filtration system shown in FIG. 2;

FIG. 5 is a cross section of a multiple barrier antimicrobial filter of the water filtration system shown in FIG. 2 and as seen from the plane indicated by the line 5—5 in FIG. 2;

DETAILED DESCRIPTION OF THE PREFERRED EMBODIMENT

Figure 1:
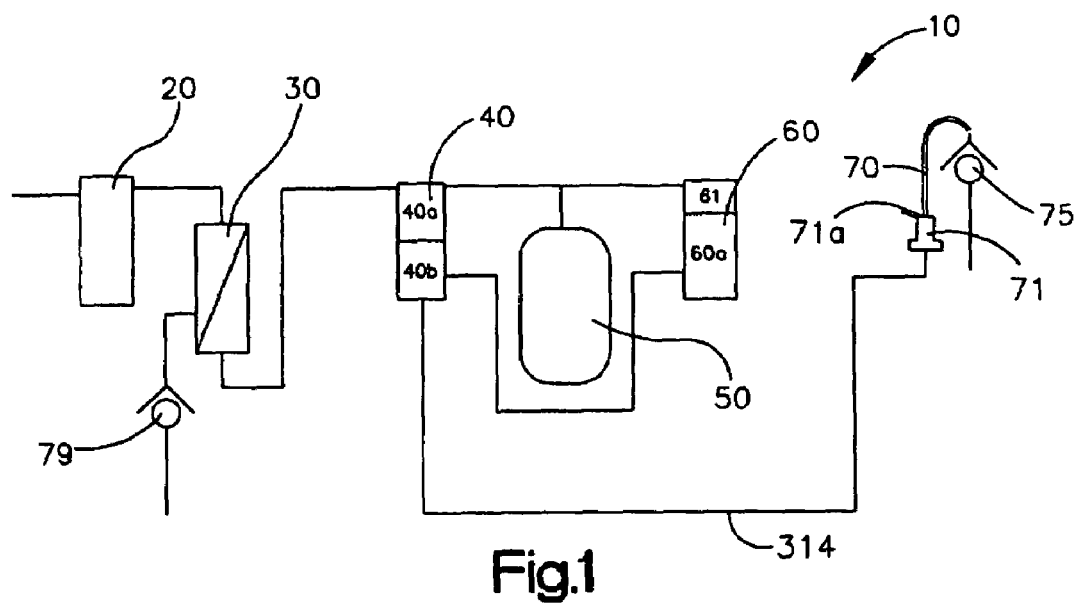
FIG. 1 is a schematic representation of a water filtration system constructed in accordance with the present invention.

FIG. 1 illustrates schematically a water treatment system 10 for removing particulate and microbial contaminants from water. The water treatment system 10 designed for mounting under the sink in a typical residential kitchen and for dispensing treated water from a system dedicated faucet 70 including a flow control valve 71 having an operating handle 71a. The system includes a pre-filter 20 such as Kinetico part number 9309 and a reverse osmosis filter 30 (such as that disclosed in U.S. Pat. No. 4,650,586, assigned to assignee of the present invention and incorporated herein by reference) placed in series to remove a majority of contaminants typically found in residential water supplies. While an RO filter is described herein, it will be apparent to one of skill in the art that any cross flow membrane filter such as a nanofiltration unit, an ultrafiltration unit, or a microfiltration unit can be used to practice the present invention. The pre-filter 20 filters out entrained solids to reduce the incidence of plugging of the internal membrane (not shown) in the reverse osmosis filter 30 and is believed to prolong the life of the reverse osmosis filter. A check valve 79 on the concentrate line of the RO filter prevents entry of contaminants into the system via the concentrate line.

A multiple barrier microbial filtration unit 40 that includes a viral filter membrane 40a and a bacterial membrane 40b polishes the water that exits the reverse osmosis filter 40 to remove microbial pathogens from the water. The RO filter 30 removes a large percentage of the contaminants that remain in the water after treatment by the pre-filter 20 to prevent clogging of the relatively fine pores found in the viral and bacterial membrane filters 40a, 40b. In addition, the RO filter serves as a flow limiting device that controls the flow to the viral membrane filter 40a thereby facilitating operation of the viral filter membrane at a sufficiently slow flow rate that optimizes contaminant removal based on a relatively small filter membrane size.

A storage tank 50 such as is placed in fluid communication with an outlet of the viral membrane 40a to store water that has been treated by the viral membrane. The placement of the storage tank 50 after the viral membrane 40a, but before the bacterial membrane 40b, improves the flow capacity of the overall system. This is because the flow capacity of the viral filter membrane 40a is significantly lower than the desired flow rate for the faucet 70. The flow capacity of the bacterial membrane 40b is higher than that of the viral membrane and as such, water can be pulled from the storage tank 50 on demand by the faucet and be treated by the bacterial membrane 40b to filter out contaminants originating from the storage tank or have passed through prior filters at a flow rate that is acceptable in terms of providing flow at the faucet. The bacterial membrane 40b also serves as a protection against bacterial contamination that may enter the system at the faucet 70. A post filter 60, such as the one disclosed in U.S. Pat. No. 4,698,164 assigned to the assignee of the present invention and incorporated herein by reference, is positioned between the viral membrane 40a and the bacterial membrane 40b to provide an additional filter to protect against contaminants that originate in the storage tank or have passed through prior filters. In addition, the post filter 60 serves as a fluid monitor by monitoring the amount of water flowing to the anti-bacteria membrane 40b and shutting off flow via an internal flow control mechanism (not shown) once a predetermined amount of water has been treated. This shut off feature prevents system usage once the filter element performance has degraded to an unacceptable level.

Figure 2:
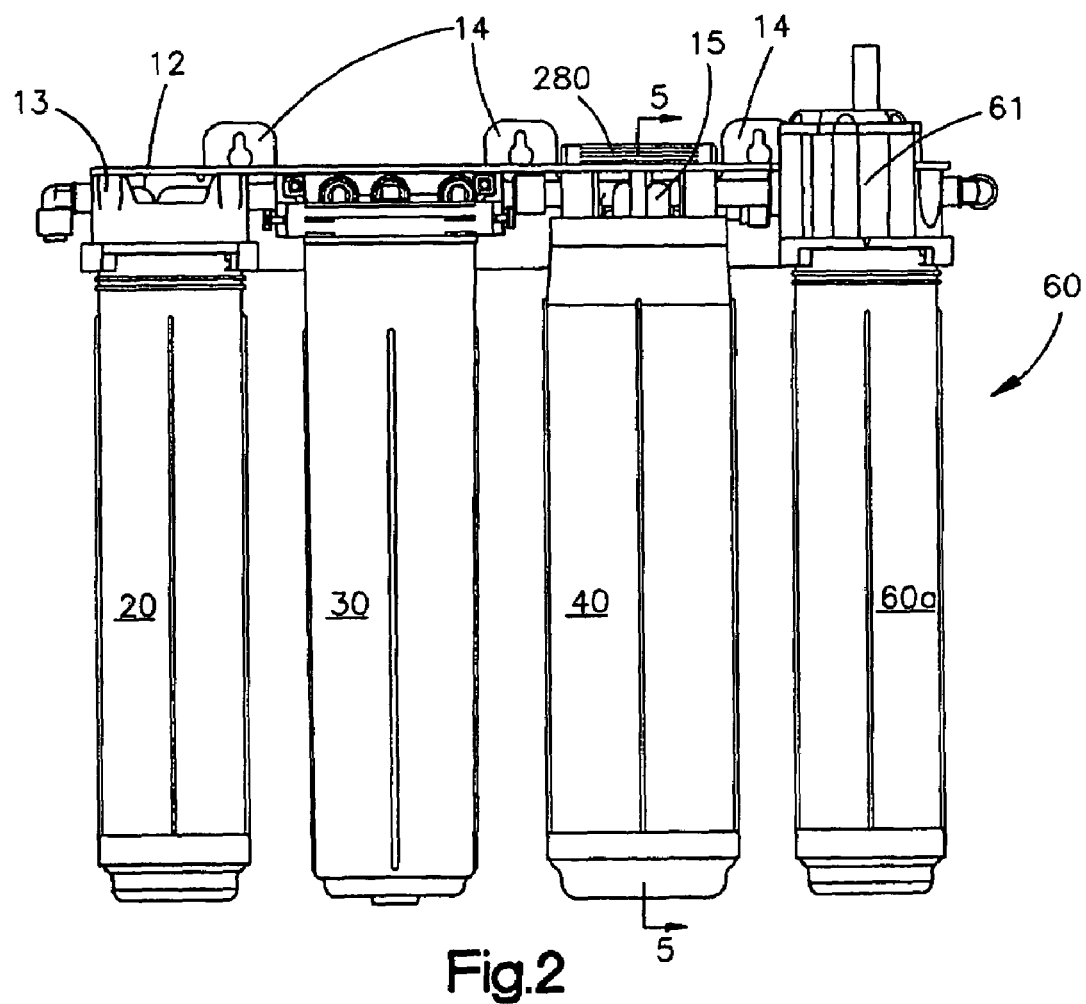
FIG. 2 is a front plan view of a water filtration system depicted in FIG. 1.

FIG. 2 is a front plan view of a water treatment system 10. A mounting bracket 12 with mounting tabs 14 for connecting the bracket under a typical residential sink supports a manifold assembly 13. The manifold assembly 13 includes water conduit and connection points for replaceable cartridge portions of the various filter units that make up the system: the pre-filter 20, the reverse osmosis filter 30, the multiple barrier microbial filtration unit 40, and the post filter 60 having a flow monitoring head 61 that gives an indication of the amount of water that has been treated by the current cartridge and shuts of flow when a predetermined amount of water has been treated. An outlet connection (to be described) is connected to a line 314 that runs to the faucet 70 (shown in FIGS. 1, 3 and 10). While this particular combination of pre-filter, reverse osmosis filter, and post filter is discussed for the purposes of this description, other combinations of filters that may or may not include these filters may be used in conjunction with the multiple barrier microbial filtration unit in the practice of the present invention.

Figure 3:
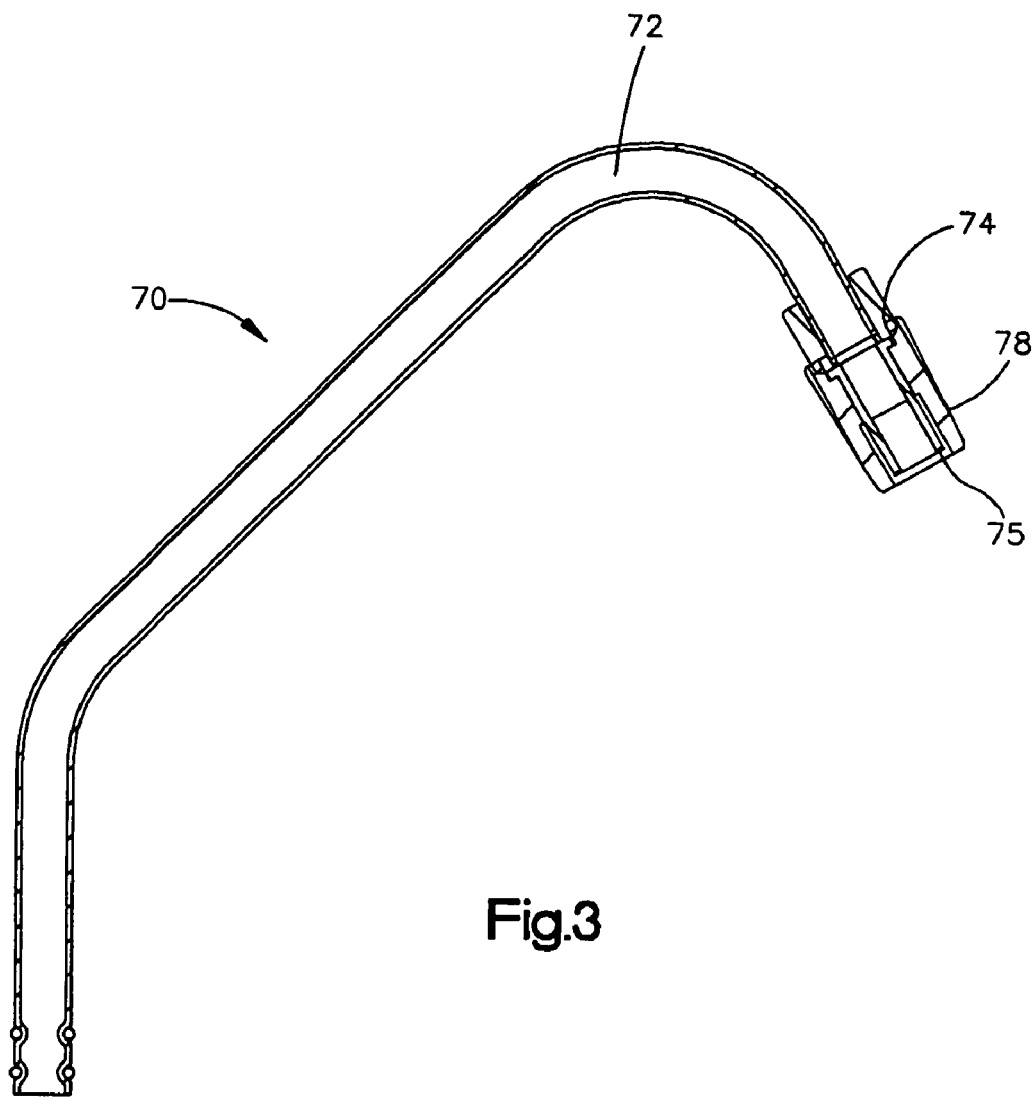
FIG. 3 is a cross section view of a water dispensing faucet in accordance with a feature of the present invention.

Referring now to FIG. 3, a cross sectional view of the faucet 70 is shown. A water conduit or spout 72 terminates at one end in a dispensing orifice 74. A check valve 75 such as a duck bill check valve supplied by Vernay Laboratories, Inc. of Yellow Springs, Ohio as part number VA 4295 is held adjacent to the dispensing orifice 74 by a protective shield or spout tip 78 that encloses the check valve 75 and is pressed or threaded onto the water conduit 72. Due to the presence of bacterial contaminants in the kitchen and bathroom sinks to which the faucet is mounted, it is beneficial to employ this check valve to protect the system from contaminants in the air, splashes, or objects found in the sink. To further enhance the contamination reducing capability of the system, the check valve 75 may be molded of a material that includes an antimicrobial treatment. The check valve 79 (FIG. 1) on the concentrate line may be a similar duck bill type valve appropriately sized for the concentrate line. Alternately, conventional ball-type check valves may be used.

Multiple Barrier Microbial Filtration Unit

FIG. 4 illustrates details of the multiple barrier microbial filtration unit 40 that filters microbial contaminants from the water. The microbial filtration unit 40 is connected to an associated manifold portion 15 that forms part of the manifold assembly 13, with screws, tabs, or other appropriate means. The manifold 15 provides appropriate fluid paths to route the water into and out of the various components of the microbial filtration unit 40. The internal workings of the manifold will be further explained below. An inlet 41 defined by the manifold 41 routes water from the reverse osmosis filter 30 to the microbial filtration unit 40 via a first input port 110 that is in fluid communication with the microbial filtration unit 40

The microbial filtration unit 40 includes a sealed outer housing indicated generally as 45 having an end cap 43 that is welded to the housing after assembly of the filter elements 40a and 40b therein. It is believed that enclosing the viral filter membrane 40a and the bacterial filter membrane 40b in a single cartridge eliminates overall system performance variations that might be caused by housing the filter membranes separately and in addition the single cartridge facilitates removal and replacement by the end user. The viral filter membrane 40a engages the end cap 43 to locate the element such that first fluid channel 114 is defined between the inner wall of the housing and the outer surface of the membrane 40a. The viral filter membrane 40a is cylindrical in shape and includes a pleated membrane filter element disposed concentrically about a tubular supporting structure and encased in an outer protective jacket having fluid access openings therein. Filters such as the viral filter membrane are known in the art. An example of the viral filter 40a is manufactured by Pall Corporation of New York under part number VABV20P0A. The viral filter membrane 40a engages and sits upon an interior connector 44 having a fluid path (to be described in connection with FIG. 6) for incoming water to enter into the first fluid channel 114 through a first inlet port 110 and through a first inlet conduit 1 12. The water flows to a first interior filter channel 115 by passing through the filter membrane 40a to remove contaminants and treated, outgoing water exits the viral filter membrane 40a through a first outlet conduit 116 that is connected to the manifold 15 by a first outlet port 118. O rings 135, 131 seal the interface between the viral filter membrane 40a and the interior connector 44, and the interior connecter 44 and the outer housing 45, respectively.

The manifold 15 provides a fluid path from the first outlet port to both the storage tank 50 (FIG. 1) and the bacterial filter 40b such that water will flow to the storage tank unless the tank is empty and there is a demand for water at the faucet 70. In this case, the water from the viral filter membrane 40a will travel directly to the post filter 60 and on to the bacterial filter 40b as described in further detail below. The storage tank enhances the overall output capability of the system because it buffers the flow reducing effect of the small pore size needed to filter out small, virus sized particles removed by the viral filter membrane 40a.

The post filter 60 (FIGS. 1 and 2) includes a carbon filter (not shown) that removes contaminants from the water that may be have passed through the prior filters or are a result of the environment of the storage tank. In addition, as already described, the post filter serves as a fluid monitor to shut off flow through the system once a predetermined quantity of water has been treated. Replacement of the cartridge on the post filter resets the monitor so that flow can be reestablished.

Referring again to FIG. 4, the bacterial filter membrane 40b is cylindrical in shape and includes a pleated membrane filter element disposed concentrically about a tubular supporting structure and encased in an outer protective jacket having fluid access openings therein. Filters such as the bacterial filter membrane are known in the art. An example of this type of filter is manufactured by Pall Corporation of New York under part number NA7AA00P0A. The bacterial filter membrane 40b engages the interior manifold 44 to locate the membrane and form a second fluid channel 121 through which water can flow from a second inlet port 127 and through the bacterial filter membrane 40b to a second outlet channel 122 that is in fluid communication with a second outlet port 130. The outlet port 130 connects to the manifold 15 which provides a connection to the faucet 70.

As can be seen from the foregoing description, by providing multiple barrier microbial filtering capabilities in conjunction with a cross flow membrane filter, a filtration system capable of significantly reducing microbial contaminants from water can be provided in a unit sized to fit beneath a residential sink.

Figure 6:
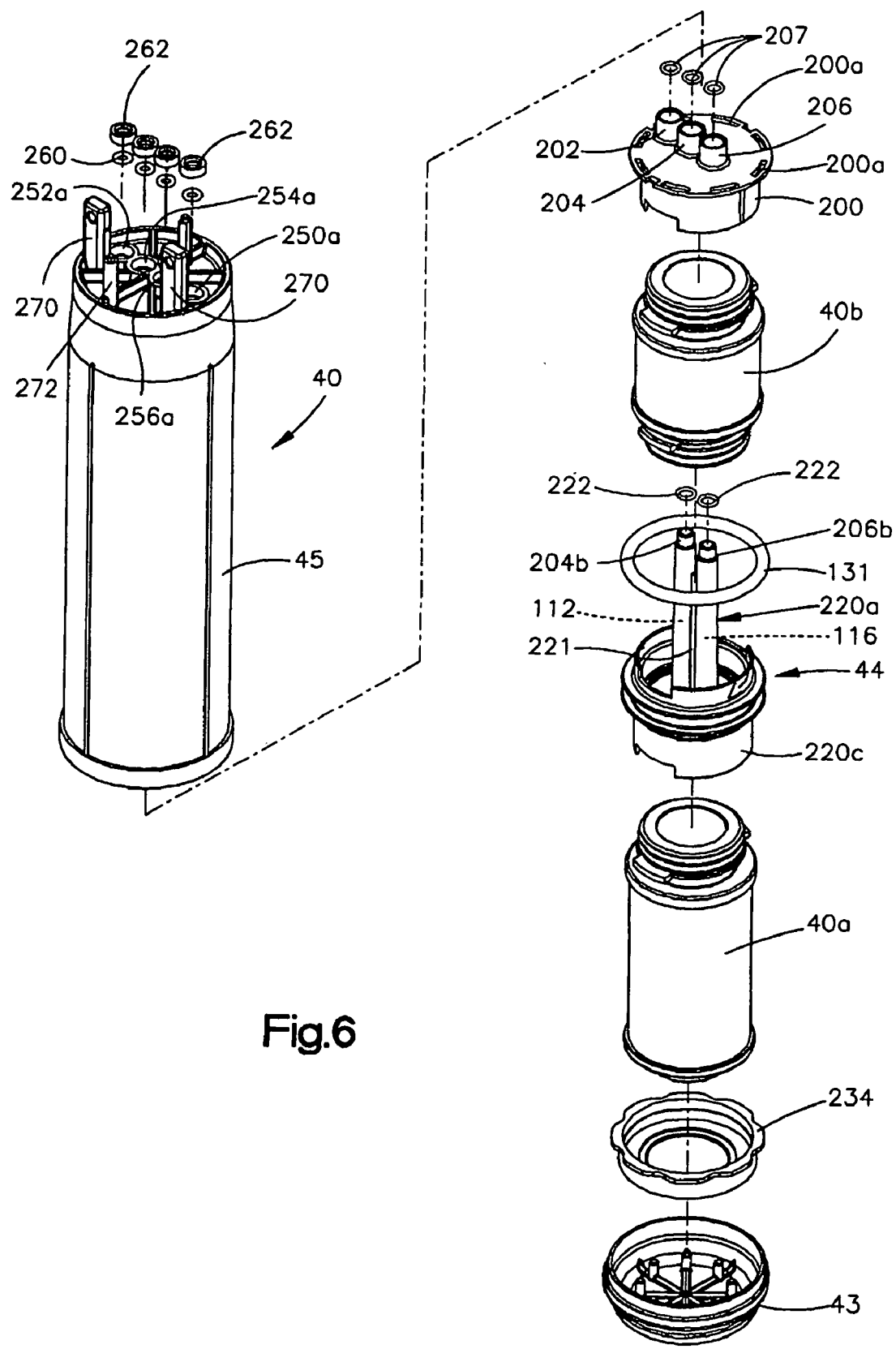
FIG. 6 is an exploded view of the multiple barrier anti-microbial filter.
Figure 7:
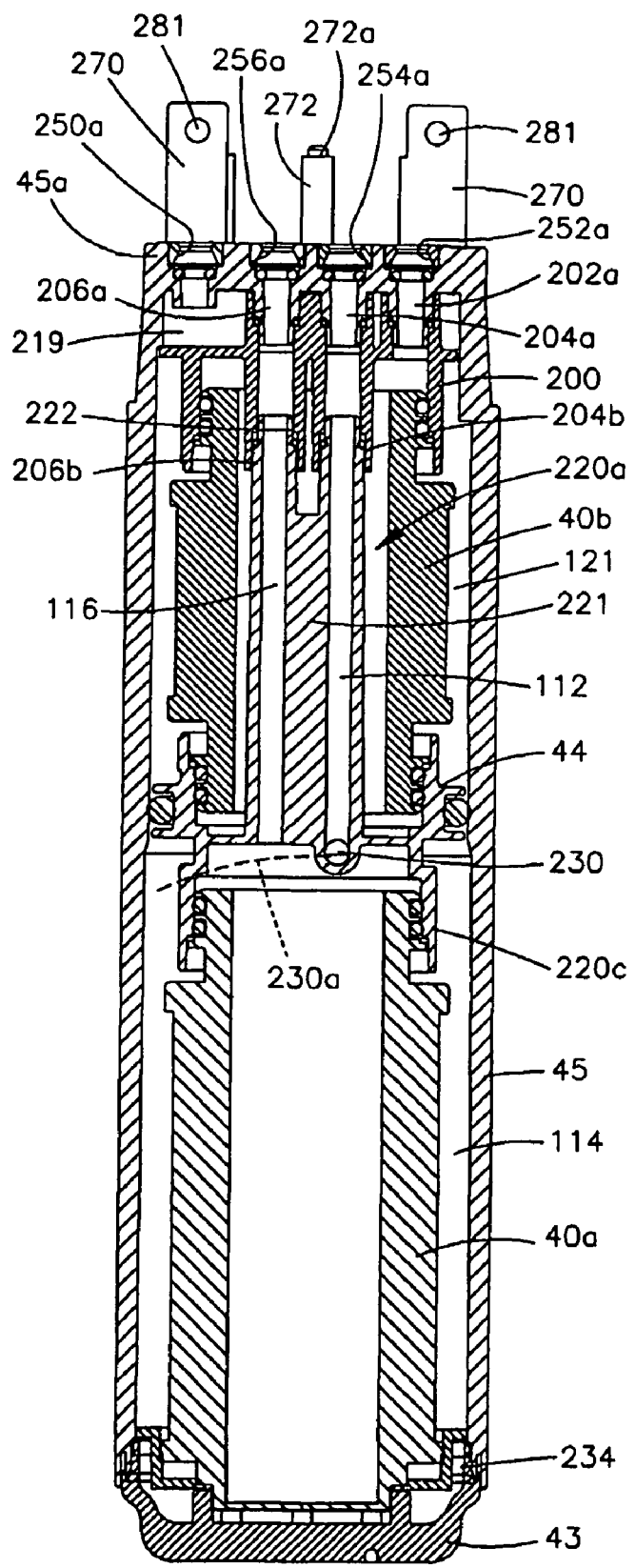
FIG. 7 is another sectional view of the anti-microbial filter substantially similar to the cross section shown in FIG. 4, but showing the filter detached from the water filtration system.
Figure 8:
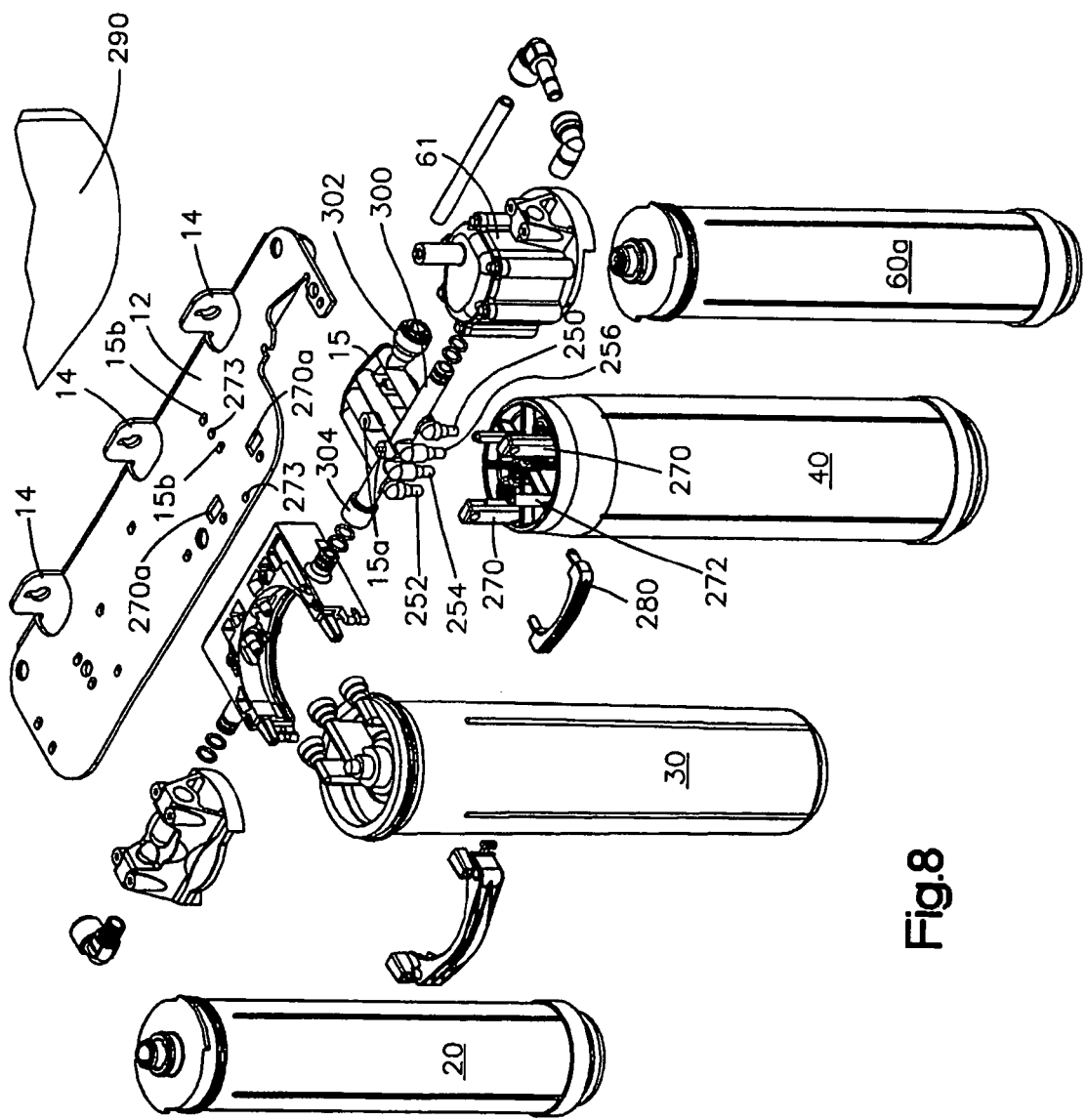
FIG. 8 is an exploded view of the water filtration system shown in FIG. 2.
Figure 9:
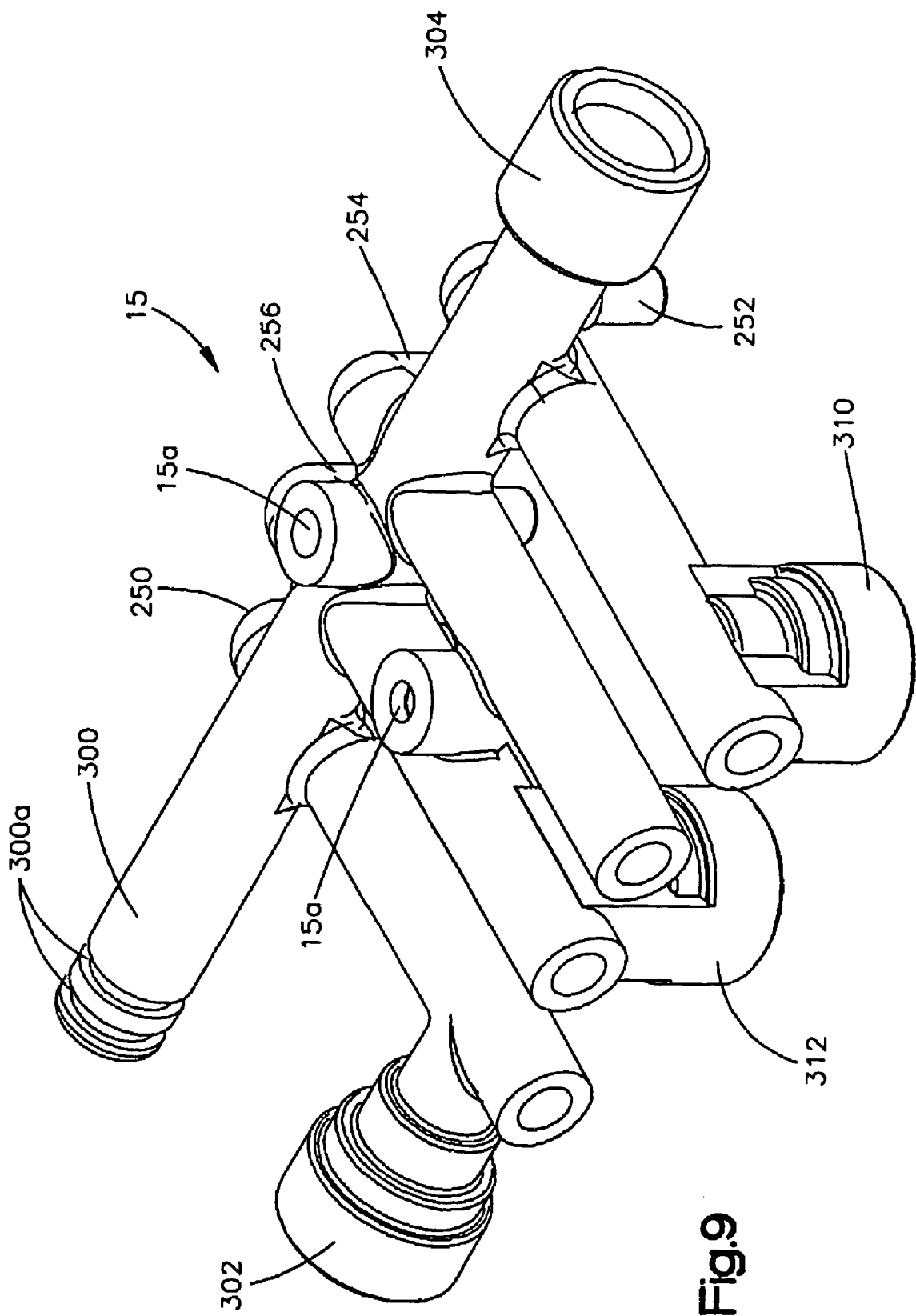
FIG. 9 is a perspective view of a manifold that forms part of the water filtration system.

FIGS. 6–14 illustrate other features and constructional details of the present invention. In the preferred embodiment, the multiple barrier filtration unit 40 is configured as a replaceable cartridge. Referring, in particular, to FIG. 6, the filtration unit 40 includes the outer housing 45 (previously described) that is closed at its bottom end by the end cap 43. An assembly of components is captured within the housing 45 and end cap 43. The components include the viral and bacterial filter units 40b, 40a (previously described). The upper part of the viral filter 40b is secured to an adapter 200 which defines three upwardly directed sockets 202, 204, 206. Referring also to FIG. 7, these three sockets sealingly engage nipples 202a, 204a, 206a which depend downwardly and are integrally formed with a top 45a of the housing 45. Associated O-rings 207 (FIG. 6) seal the interface between the sockets and nipples.

Referring to FIGS. 4–7, a water receiving or inlet chamber 219 is defined between the top of the adapter 200 and the underside of the cartridge housing. As seen best in FIG. 7, the inlet port 250a communicates with the inlet chamber 219. Water to be treated is received in the chamber 219 and travels to the second fluid channel 121 via slots 200a (shown in FIG. 6) formed in the adapter 200.

As described above, the bottom of the viral filter 40b sits on the connector 44. The connector includes an upstanding, integrally molded pipe assembly 220a that defines the fluid passages 112, 116 (see also FIG. 4). A rigidizing rib 221 is molded between the pipe structure. A pair of nipples 206b, 204b sealingly engage the sockets 204, 206 defined in the cap 200. Associated O-rings 222 seal the interface between the nipples and sockets. Also integrally formed in the connector 220 is a cross passage 230 which communicates the passage 112 (defined by the pipe assembly 220a) with the region 114 (see also FIG. 4) that surrounds the viral filter 40a. The communication is indicated by the dashed line 230a in FIG. 7. In particular, the cross passage 230 communicates the channel 112 with the outside of a downwardly depending flange 220c forming part of the connector 220. The outside of the flange 220c communicates with the region 114, i.e., the outside of the viral filter 40a.

The bottom of the viral filter 40a sits on a filter spacer 234 which, in turn, fits within and sealingly engages the bottom cover 43 of the filter housing. Turning now to FIG. 7, the filter unit 40 is configured to be relatively easily replaceable without the need for special tools. As previously described, the water treatment system includes a mounting bracket 12 to which the fluid manifold 15 is secured. In particular and referring also to FIG. 8, the manifold 15 includes mounting apertures 15a through which fasteners extend in order to bolt the manifold to the underside of the bracket 12 by means of mounting holes 15b. The manifold portion 15 defines internal fluid passages for communicating the internal fluid paths defined by the filter unit 40 with other components of the system. In particular, and referring to FIGS. 7 and 9, the manifold 15 defines four downwardly depending nipples 250, 252, 254 and 256. The cartridge housing 45 defines four corresponding sockets 250a, 252a, 254a and 256a which are configured to receive and sealingly engage the associated manifold nipples 250, 252, 254, 256. The sockets 252a, 254a, 256a connect to and may form part of the nipples 202a, 204a, 206a, respectively. The housing sockets include associated O-rings 260 and pressed-in retainers 262 for holding the O-rings within the sockets 250a, 252a, 254a, 256a shown in FIG. 7).

The housing 45 also includes integrally molded upstanding, retaining lugs 270, as well as a pair of stabilizing standoffs 272. The standoffs 272 include reduced diameter portions 272a at their upper ends. To install the cartridge, the cartridge is positioned beneath the supporting bracket 12 and attached manifold 15. By raising the cartridge upwardly, towards the bracket, the four depending nipples 250, 252, 254, 254 of the manifold 15 enter the associated sockets 250a, 252a, 254a, 256a while concurrently, the upwardly extending lugs 270 enter and extend through complementally shaped holes 270a formed in the bracket 12. In addition, the standoffs 272 engage the underside of the bracket 12 with the reduced diameter portions 272a extending into complementally shaped holes 273 formed in the is bracket 12 (see FIG. 8).

Figure 14:
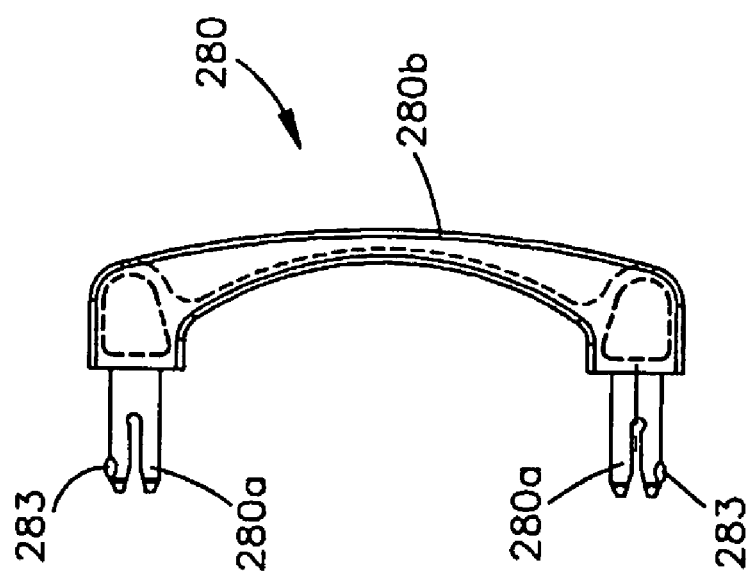

To secure the filter unit 40 to the bracket 12, a molded retainer clip 280 is removably secured to the lugs 270. The detailed construction of the retainer clip 280 is shown in FIG. 14. In particular, each lug 270 includes an aperture 281 near its upper end (shown in FIG. 7). The retaining clip 280 includes a pair of spaced apart, split pins 280a molded integrally with a handle-like portion 280b. The split pins 280a, in their relaxed state, define a diameter greater than the diameter of the holes 281 and are compressed as they are inserted into the lugs 270. The pins 280a include detents or protrusions 283 which engage the rear surface of the lugs 270 and inhibit withdrawal of the retainer 280.

As the manifold nipples 250, 252, 254, 256 enter the cartridge sockets 250a, 252a, 254a, 256a, they are sealingly engaged by the associated O-rings 260 located within the sockets and, thus, fluid leakage between the nipples and the sockets is inhibited while still providing a releasable, fluid connection.

Figure 10:
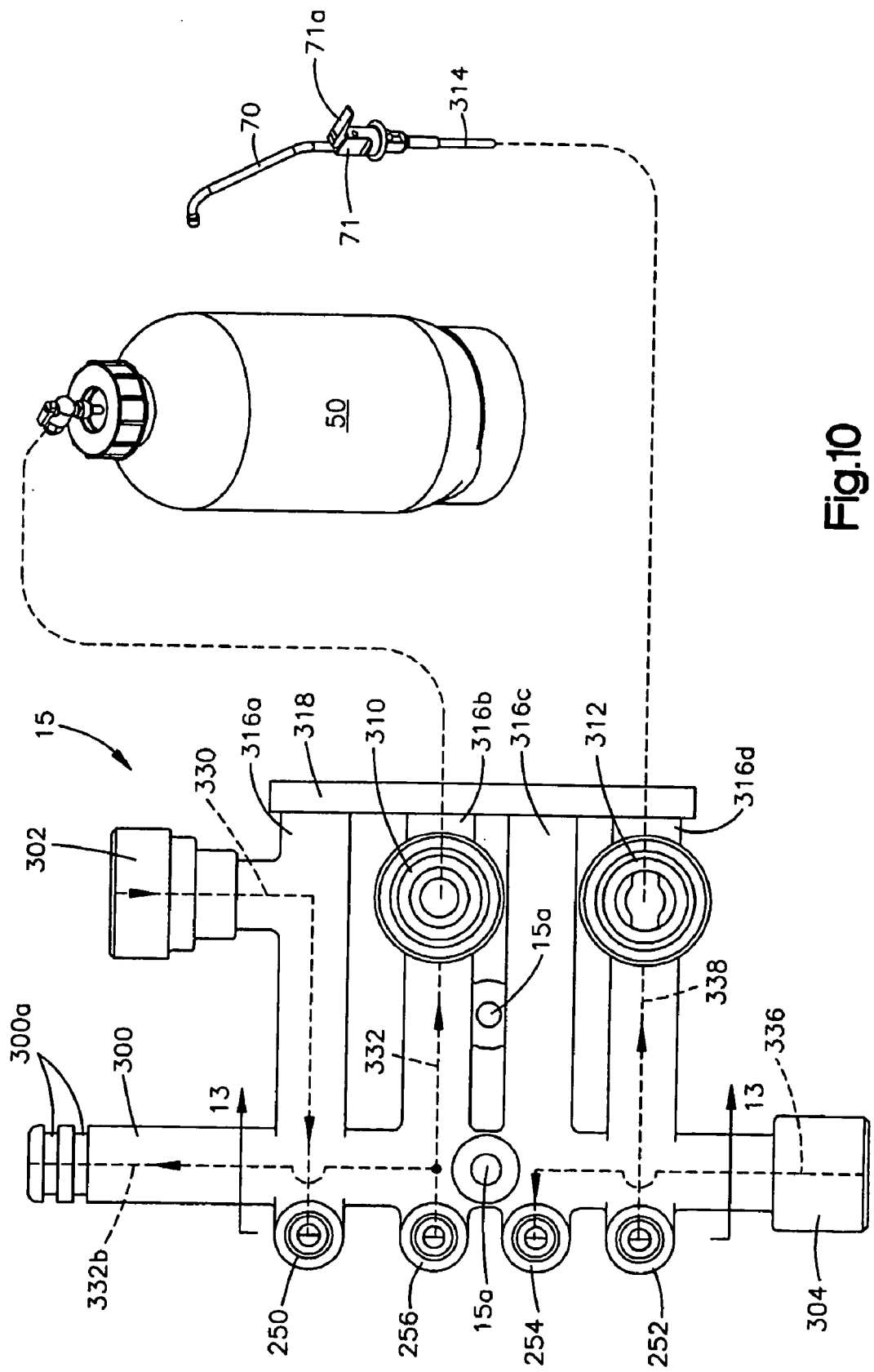
FIG. 10 is a partially schematic representation showing a bottom elevational view of the manifold shown in FIG. 9 and also illustrating fluid connections between a storage tank and faucet.

FIG. 10 illustrates an exploded view of the water treatment system and, in particular, shows the various filter units and the manifold assembly 13 and bracket 12 to which the filter units are releasably attached. A cover 290 preferably overlies the bracket 12 and hides from view the top of the bracket and the fluid connections, manifold and retainers for the filter units and cartridges.

Referring to FIGS. 9–13, the construction of the manifold portion or segment 15 (to which the filter unit 40 is attached) is illustrated. In particular, FIG. 10, which is a view of the underside of the manifold 15, illustrates schematically the fluid flow paths defined by the manifold 15 along with the connections to the storage tank 50 and faucet 70. The manifold 15 includes a conduit segment 300 which includes a pair of O-ring grooves 300a adapted to receive suitable O-rings. The conduit segment 300 is adapted to be received in an input or inlet socket of the filter 60. A socket-like connection 302 is adapted to receive a conduit that connects the socket 302 with the output of the filter unit 60. Another socket-like connection 304 forms part of the manifold 15 and is adapted to sealingly connect to a nipple which defines an output from the RO filter unit 30. The manifold 15 also defines a pair of conduit connections 310, 312. The conduit connection 310 is intended to connect with a conduit that connects the tank 50 with the manifold 15. The connector 312 connects the manifold 15 with a feed conduit 314 (see FIG. 1 and 10) for the faucet 70.

As seen best in FIG. 10, the passages 330, 332 and 338 are at least partially formed by tubular segments 316a, 316b, 316c, 316d. During manufacture of the manifold 15, the right ends (as viewed in FIG. 10) of the tubular segments are sealed. In the illustrated embodiment, a blocking plate 318 is suitably secured to the right ends of the tubular segments 316a, 316b, 316c, 316c using conventional attachment methods, such as welding or adhesively bonding.

The nipple 250, which serves as an input to the bacterial filter 40b, is connected to the socket 302 by a passage defined by the manifold and illustrated schematically by the dashed line 330.

The nipple 256, which communicates the output from the viral filter 40a with the storage tank 50 and with the input to the post filter 60 is connected to the conduit connector 310 and the conduit segment 300 by communicating internal passages 332a, 332b. With this configuration, a significant amount of water can be stored by the tank 50, rather than only processing water as it is dispensed by the faucet 70.

The nipple 254, which communicates filtered water from the RO unit 30 to the input side of the viral filter 40a, is connected to the socket 304 by an internal passage 336. The nipple 252, which is connected to the output side of the bacterial filter 40b, communicates with the conduit connector 312 by an internal passage 338. As noted above, the conduit connector 312 is connected to a feed conduit 314 for the faucet 70.

Figure 12:
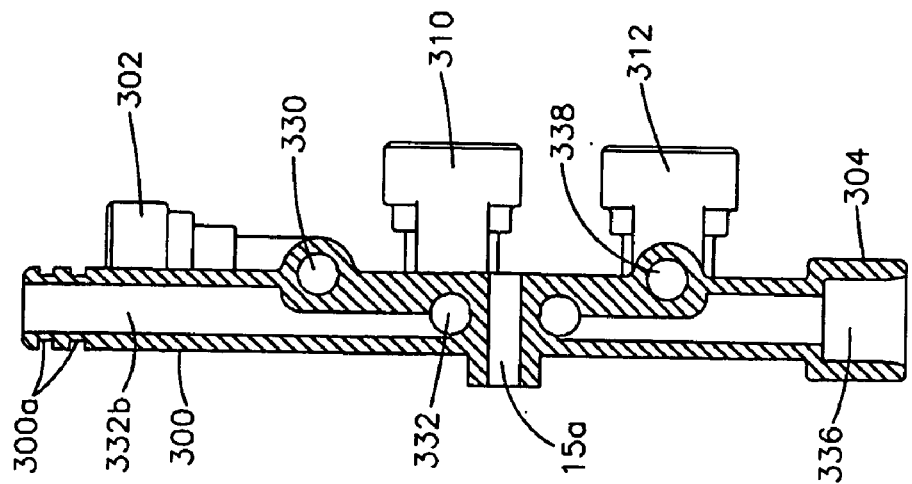
FIG. 12 is a sectional view of the manifold as seen from the plane indicated by the line 12—12 in FIG. 11.
Figure 11:
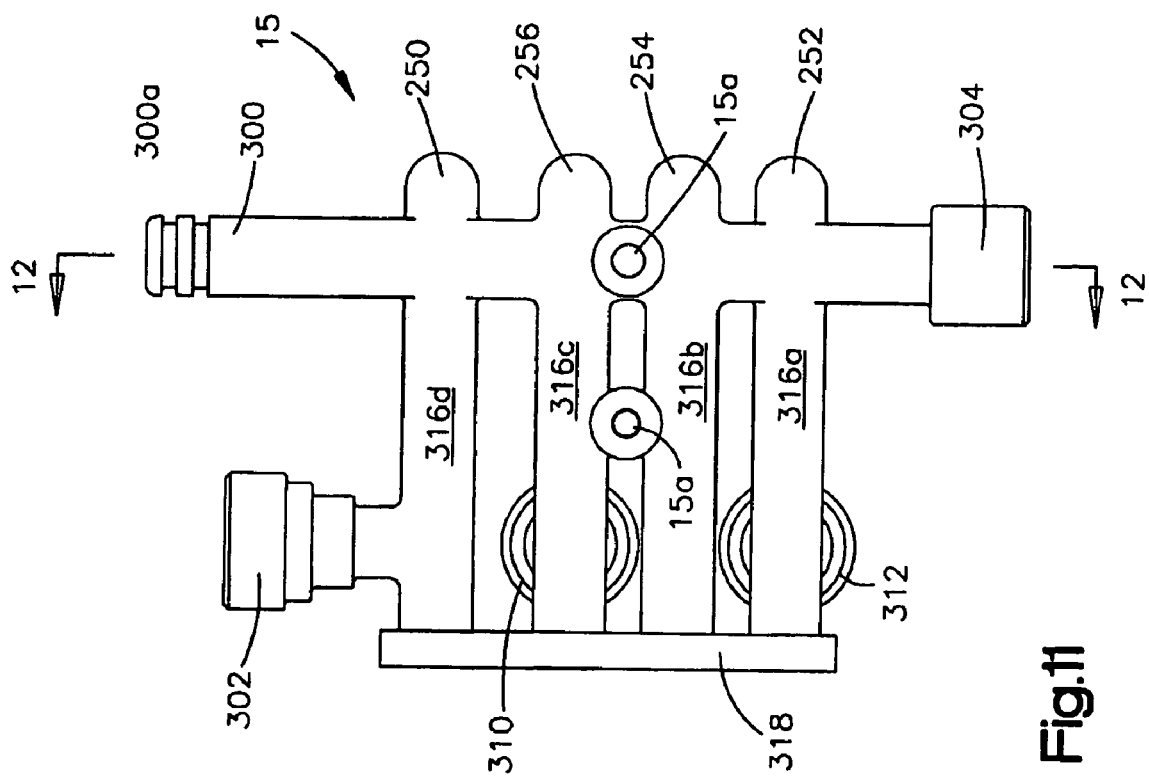
FIG. 11 is a top plan view of the manifold shown in FIG. 9.
Figure 13:
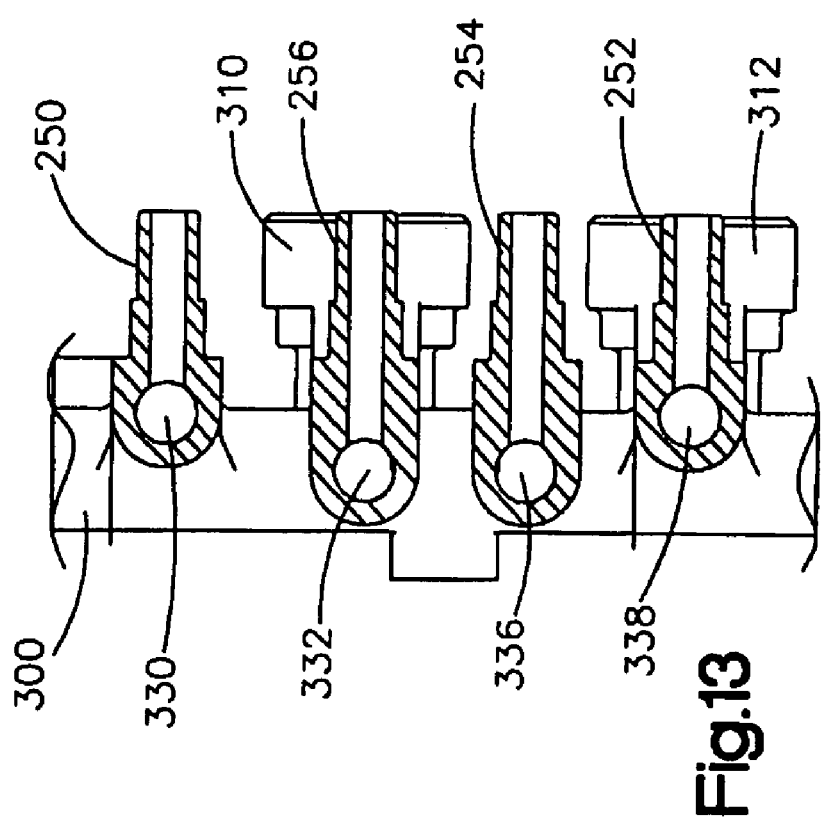
FIG. 13 is a fragmentary sectional view of the manifold as seen from the plane indicated by the line 13—13 in FIG. 10; and, FIG. 14 is a top elevational view of a locking handle.

FIGS. 12 and 13 illustrate additional details of the passages molded within the manifold 15 which are illustrated schematically in FIG. 10. It should be understood, however, that alternate configurations for the manifold portion 15, as well as the passages molded within the manifold, can be made while still providing the fluid connections and functions of the illustrated embodiment and are, therefore, contemplated by the present invention.

In the preferred embodiment, the retaining lugs 270 are disposed in a parallel relationship and are rectangular in cross-section. The standoffs 280 are located in a spaced apart relationship and are disposed at a 12:00 and 6:00 position with respect to the lugs 270 which are located at a 9:00 and 3:00 position. In the preferred and illustrated embodiment, the sockets 250a, 252a, 254a, 256a formed in the housing 45 which receive the nipples 250, 252, 254, 256 are located in a juxtaposed positions and have mutually parallel axes. It should be understood, however, that the positioning of the lugs 270, standoffs 272 and sockets 250a, 252a, 254a, 256a may be changed without substantially changing their functional purposes. The sockets 250a, 252a, 254a, 256a may, for example, be spatially oriented on the top of the cartridge housing 45 and be adapted to engage similarly spaced manifold nipples.

It should also be noted that the water treatment system illustrated in the drawings is sized for residential use. It should be understood, however, that the principles of this invention can be applied to much larger water treatment systems that could be put to commercial uses. Those skilled in the art would recognize that larger filter units and conduits would be needed in order to sustain the types of flow rates that would be required for commercial applications.

Although the present invention has been described with a degree of particularity, it is the intent that the invention include all modifications and alterations from the disclosed design falling within the spirit or scope of the appended claims.

We claim:

1. A filter apparatus for treating water containing particulate or microbial contaminants comprising:
   a first filter element disposed within a first sealed outer housing and in fluid communication with a first inlet port and a first outlet port, the first filter element having a first flow capacity and adapted to remove contaminants that are larger than a first contaminant size;
   a second filter element disposed within the first sealed outer housing and downstream of the first filter element and in fluid communication with a second inlet port and a second outlet port, the second filter element having a second flow capacity higher than the first flow capacity and adapted to remove contaminants that are larger than a second contaminant size; and
   an accumulating vessel external to said sealed outer housing and in fluid communication with the first outlet port and the second outlet port for storing water that has been treated by the first filter element prior to treatment by the second filter element.

2. The filter apparatus of claim 1 further comprising a pre-treatment filter in fluid communication with the first inlet port for removing relatively large contaminants prior to treatment by the first and second filter elements.

3. The filter apparatus of claim 1 further comprising a check valve in fluid communication with the second outlet port and downstream of the second filter element for inhibiting backflow of contaminated water into the filter apparatus.

4. The filter apparatus of claim 3 wherein the check valve is a duck bill check valve.

5. The filter apparatus of claim 3 wherein the check valve is installed in a treated water dispensing faucet in fluid communication with the second outlet port and through which treated water flows out of the filter apparatus.

6. The filter apparatus of claim 3 wherein the check valve comprises antimicrobial material.

7. The filter apparatus of claim 1 further comprising a flow monitor in fluid communication with the first outlet port that monitors an amount of water that has been treated by the filter apparatus.

8. The filter apparatus of claim 7 wherein the flow monitor is operable to discontinue the flow of water through the filter apparatus when a predetermined amount of water has been treated by the filter apparatus.

9. The filter apparatus of claim 1 further comprising a post filter in fluid communication with the accumulating vessel and adapted to remove contaminants that originate in the accumulating vessel.

10. The filter apparatus of claim 9 wherein the post filter comprises a flow monitor for monitoring an amount of water that has been treated by the filter apparatus.

11. The filter apparatus of claim 1 wherein the first filter element is a virus filter membrane capable of removing contaminants larger than 0.01 micron.

12. The filter apparatus of claim 1 wherein the second filter element is a bacteria filter membrane capable of removing contaminants larger than 0.1 micron.

13. The filter apparatus of claim 1 further comprising a cross flow membrane filter in fluid communication with the first inlet port for removing a significant amount of contaminants from the water prior to its contact with the first filter element.

14. The filter apparatus of claim 13 wherein the cross flow membrane filter is a reverse osmosis filter.

15. The filter apparatus of claim 13 comprising a check valve on a concentrate line of the cross flow membrane filter.

16. The filter apparatus of claim 1 comprising a flow limiting device in fluid communication with the first inlet port for controlling the flow of water into the first filter element.

17. A filter apparatus for treating water containing microbial contaminants comprising:
    a viral membrane filter disposed within a first sealed housing having first and second inlet ports and first and second outlet ports disposed in one or more walls of said housing, said first filter element being in fluid communication with the first inlet port and a first outlet port, the viral membrane filter having a membrane pore size suitable for removing contaminants larger than 0.01 micron;
    a bacterial membrane filter disposed downstream of the viral membrane and in fluid communication with the second inlet port and the second outlet port, the bacterial filter membrane having a membrane pore size suitable for removing bacterial contaminants larger than 0.1 micron; and
    wherein the bacterial filter element is disposed within the first sealed outer housing; and comprising a manifold providing fluid oaths into and out of the membrane filters.

18. The filter apparatus of claim 17 further comprising a pre-treatment filter in fluid communication with the first inlet port for removing relatively large contaminants prior to treatment by the anti viral and bacterial filter membranes.

19. The filter apparatus of claim 17 further comprising a check valve in fluid communication with the second outlet port and downstream of the bacterial filter membrane for inhibiting backflow of contaminated water into the filter apparatus.

20. The filter apparatus of claim 19 wherein the check valve is a duck bill check valve.

21. The filter apparatus of claim 19 wherein the check valve is installed in a treated water dispensing faucet in fluid communication with the second outlet port and through which treated water flows out of the filter apparatus.

22. The filter apparatus of claim 19 wherein the check valve comprises antimicrobial material.

23. The filter apparatus of claim 17 further comprising a flow monitor in fluid communication with the first outlet port that monitors an amount of water that has been treated by the filter apparatus.

24. The filter apparatus of claim 23 wherein the flow monitor is operable to discontinue the flow of water through the filter apparatus when a predetermined amount of water has been treated by the filter apparatus.

25. The filter apparatus of claim 24 wherein the post filter comprises a flow monitor for monitoring an amount of water that has been treated by the filter apparatus.

26. The filter apparatus of claim 17 further comprising a cross flow membrane filter in fluid communication with the first inlet port.

27. The filter apparatus of claim 26 wherein the cross flow membrane filter is a reverse osmosis filter.

28. The filter apparatus of claim 26 comprising a check valve on a concentrate line of the cross flow membrane filter.

29. The filter apparatus of claim 17 further comprising an accumulating vessel for storing water that has been treated by the viral filter member prior to its treatment by the bacterial filter membrane.

30. The filter apparatus of claim 29 further comprising a post filter in fluid communication with the accumulating vessel and adapted to remove contaminants that originate in the accumulating vessel or passed through the bacterial filter membrane.

31. The filter apparatus of claim 17 comprising a flow limiting device in fluid communication with the first inlet port for controlling the flow of water into the first filter element.

32. A filter apparatus for removing contaminants from water containing microbial contaminants comprising:
- a cross flow membrane filter for removing a significant amount of relatively large contaminants from the water;
- a viral membrane filter disposed within a first sealed outer housing and in fluid communication with cross flow membrane filter; the viral membrane filter adapted to remove viral contaminants;
- an accumulating vessel disposed in fluid communication with the viral membrane filter for storing water that has been treated by the viral membrane; and
- a bacterial membrane filter in fluid communication with the accumulating vessel, the bacterial membrane filter adapted to remove bacterial contaminants from water that has been stored in the accumulating vessel.

33. The filter apparatus of claim 32 wherein the cross flow membrane filter is a reverse osmosis filter.

34. The filter apparatus of claim 32 wherein the bacterial membrane filter is disposed in the first sealed outer housing.

35. The filter apparatus of claim 32 wherein at least one of the viral and bacterial filter membranes is generally cylindrical in shape and has a central void and wherein water flowing to and from the other of the viral and bacterial filter membrane flows within the central void.

36. A treated water dispensing faucet for dispensing water that has been treated to remove contaminants comprising:
- a conduit for directing the flow of treated water from a filtration system to a dispensing station wherein the conduit has a first end connected to the filtration system and a second end that opens to the dispensing station; and
- an antimicrobial check valve constructed of an antimicrobial material having an antimicrobial treatment wherein the check valve is mounted to the second end for inhibiting the back flow of contaminants to the filtration system.

37. The treated water dispensing faucet of claim 36 wherein the check valve is a duck bill check valve.

38. The treated water dispensing faucet of claim 36 comprising a valve shield member that substantially encloses the check valve for preventing contact between foreign objects and the check valve.

39. The treated water dispensing faucet of claim 36 wherein the check valve comprises antimicrobial material.

40. For use with a water treatment system, a filter cartridge, comprising:
- a) a housing defining first and second isolated regions within said housing;
- b) said first region including a flow path extending between a first inlet port and a first outlet port;
- c) said second region including a flow path extending between a second inlet port and a second outlet port;
- d) attachment structure comprising a pair of upstanding lugs sized to be received in apertures in a support forming part of said water treatment system and wherein said attachment structure further includes locking member receiving structure for maintaining the position of said lugs with respect to said support and,
- f) said ports arranged in a substantially linear, side by side relationship and adapted to establish fluid connections between the filter cartridge and a manifold forming part of a water treatment system when said filter cartridge is installed in an operative position.

41. The apparatus of claim 40, wherein said first region includes a first filter element for treating water at it flows between said first inlet and said first outlet.

42. The apparatus of claim 41, wherein said second region includes a second filter element for treating water as it flows between said second inlet and said second outlet.

43. The apparatus of claim 42, wherein said fluid flow path for communicating water from said second inlet to said second outlet includes inlet and outlet conduits that extend through said first region in order to communicate with said second inlet and said second outlet.

44. The filter cartridge of claim 42, wherein said first filter element comprises a viral filter and said second filter element comprises a bacterial filter.

45. Structure for establishing fluid communication between a fluid manifold forming part of a water treatment system and a filter assembly, comprising:
- a) a port housing defining four upstanding ports arranged in a side-by-side, substantially linear relationship and a pair of upstanding lugs defining locking apertures for receiving a lock member, said lugs adapted to be received in a support member whereby said port housing is maintained in fluid communication with said manifold;
- b) a first port of said four upstanding ports defining an inlet for communicating water to be treated to a first region forming part of the filter assembly and a second port of said four upstanding ports defining an outlet for receiving treated water from said first region; and,
- c) a third port of said four upstanding ports defining an inlet for communicating water to be treated to a second region forming part of the filter assembly and a fourth port of said four upstanding ports defining an outlet for receiving treated water from said second region.

46. The apparatus of claim 44, wherein said port housing forms part of said filter assembly.

47. The apparatus of claim 46, wherein said port housing and a filter assembly housing are integrally molded.

48. The apparatus of claim 45, wherein said port housing further includes a pair of stand-offs also engageable with said support member and operative to further stabilize the port housing with respect to said support member.

49. A water dispensing faucet for a water treatment system, comprising:
- a) a flow control valve controlling the dispensing of water by the faucet;
- b) a water conduit extending from the flow control valve defining at least partially a flow path extending from said handle to a water dispensing tip; and,
- c) an antimicrobial check valve constructed of an antimicrobial material having an antimicrobial treatment wherein the check valve is positioned along said flow path and arranged to permit water flow from said flow control valve to said dispensing tip, but inhibiting reverse flow.

50. The apparatus of claim 49, wherein said check valve is located along said flow path, near said dispensing tip.

51. The apparatus of claim 49, wherein said check valve is positioned within said dispensing tip.

52. The apparatus of claim 49, wherein said check valve comprises a duck bill type check valve.

53. A water treatment system comprising:
a) a first filter element including a virus filter;
b) a reverse osmosis filter upstream of said virus filter, said virus filter arranged to receive water from said reverse osmosis filter;
c) a storage tank in fluid communication with an output of said virus filter
d) a bacterial membrane filter element in fluid communication with said virus filter and operative to treat water discharged by said tank, said bacterial filter adapted to remove bacteria from said water; and
e) a water dispenser in fluid communication with said bacterial membrane filter and operative to dispense water from said water treatment system.

54. The water treatment system of claim 53, wherein said viral filter and second filter are both located in a single, replaceable cartridge unit.

55. The water treatment system of claim 53, wherein said second filter is a bacteria removing filter.

56. The water treatment system of claim 53, further comprising a post filter located intermediate said second filter and said water dispenser.

57. The water treatment system of claim 53, wherein said viral filter is capable of removing contaminants larger than 0.01 microns.

58. The water treatment system of claim 53, wherein said second filter comprises a bacterial membrane capable of removing contaminants larger than 0.1 microns.

59. The water treatment system of claim 53, wherein said viral filter includes a virus removing membrane.

60. The water treatment system of claim 53, wherein said second filter includes a bacterial membrane.

61. The water treatment system of claim 53, further including a pre-filter upstream of said reverse osmosis filter, said reverse osmosis filter arranged to receive water from said pre-filter.

62. A water treatment system comprising:
a) a reverse osmosis filter;
b) a manifold for delivering water to be treated to said reverse osmosis filter;
c) a replaceable multi barrier filter including a first filter element and a second filter element;
d) a storage tank for accumulating at least partially treated water;
e) a dispenser for dispensing treated water from said water treatment system;
f) said first filter element being a viral membrane filter having an input in fluid communication with said reverse osmosis filter and an output in fluid communication with said storage tank; and,
g) said second filter element being a bacterial membrane filter that is in fluid communication with said storage tank and having an outlet in fluid communication with said water dispenser.

63. The water treatment system of claim 62, further comprising a post filter located intermediate said second filter element and said water dispenser and operative to filter water discharged by said second filter element prior to being dispensed by said water dispenser.

64. The water treatment system of claim 62, wherein said water dispenser includes a check valve for inhibiting the entry of contaminants into said dispenser from a region external to said dispenser.

65. The water treatment system of claim 64, wherein said check valve comprises a duck bill check valve.

66. A water treatment system comprising:
a) a first filter element including a virus filter;
b) a reverse osmosis filter upstream of said virus filter, said virus filter arranged to receive water from said reverse osmosis filter;
c) a second filter element in fluid communication with said virus filter and operative to treat water discharged by said virus filter, said second filter adapted to remove bacteria from said water and having a larger pore size than said virus filter; and
d) a water dispenser in fluid communication with said second filter and operative to dispense water from said water treatment system.

* * * * *